Jan. 12, 1971  R. H. REED  3,554,578
ADJUSTABLE TRAILER HITCH
Filed Nov. 12, 1968  2 Sheets-Sheet 2
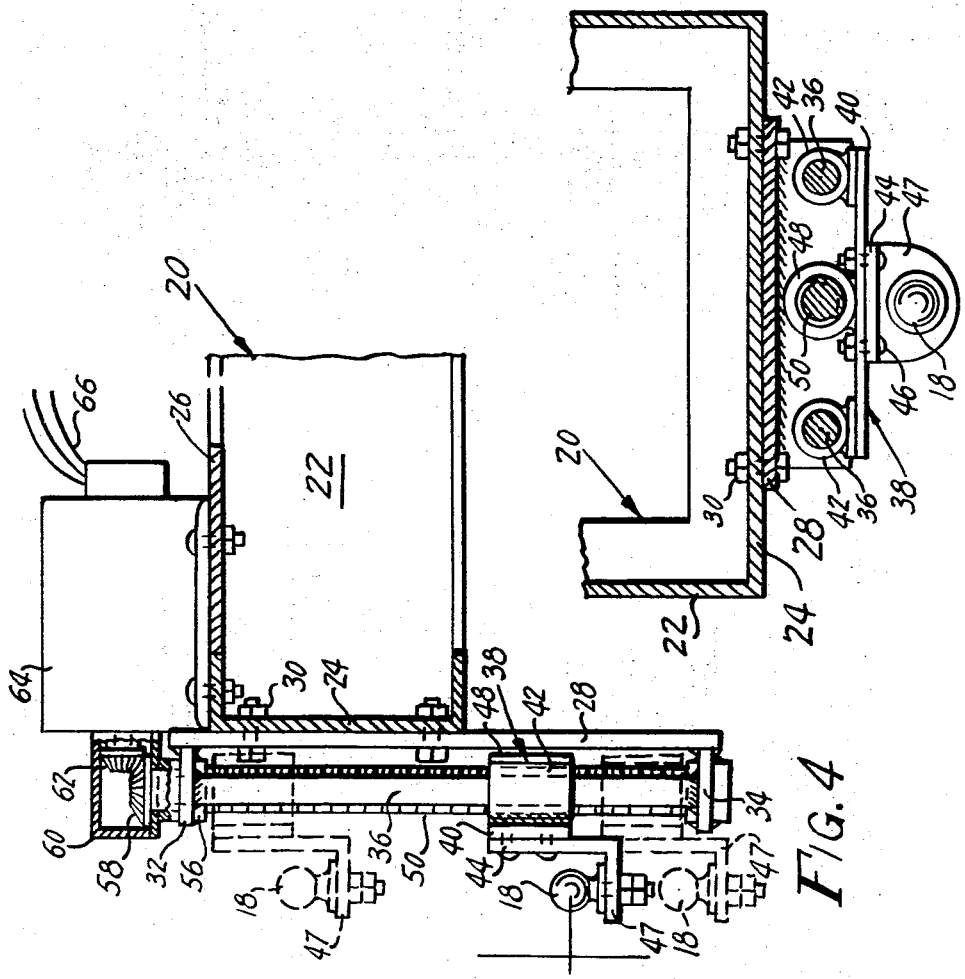
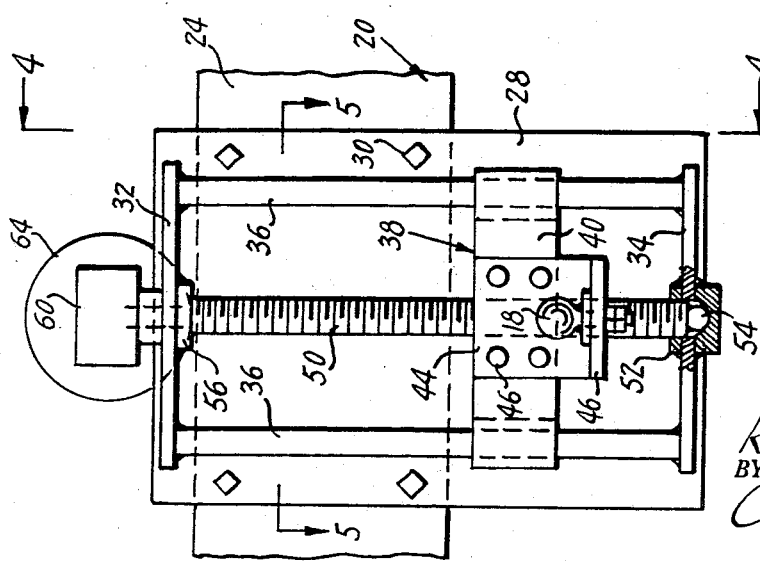
INVENTOR.
ROWLAND H. REED
BY
Alexander B. Blair
ATTORNEY.

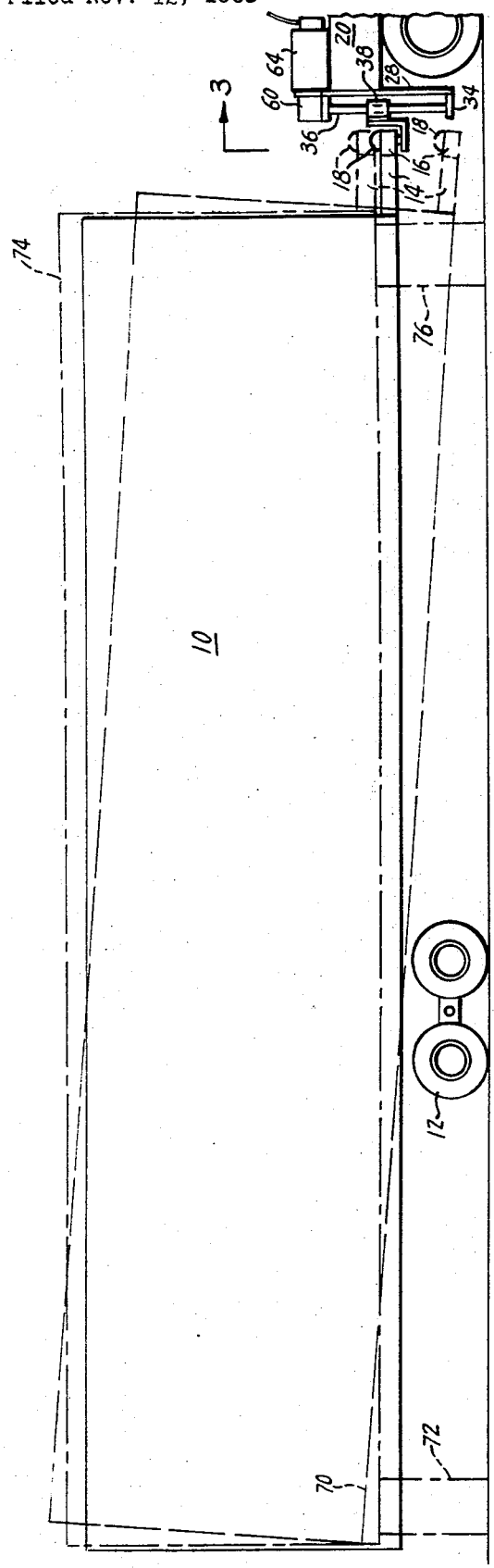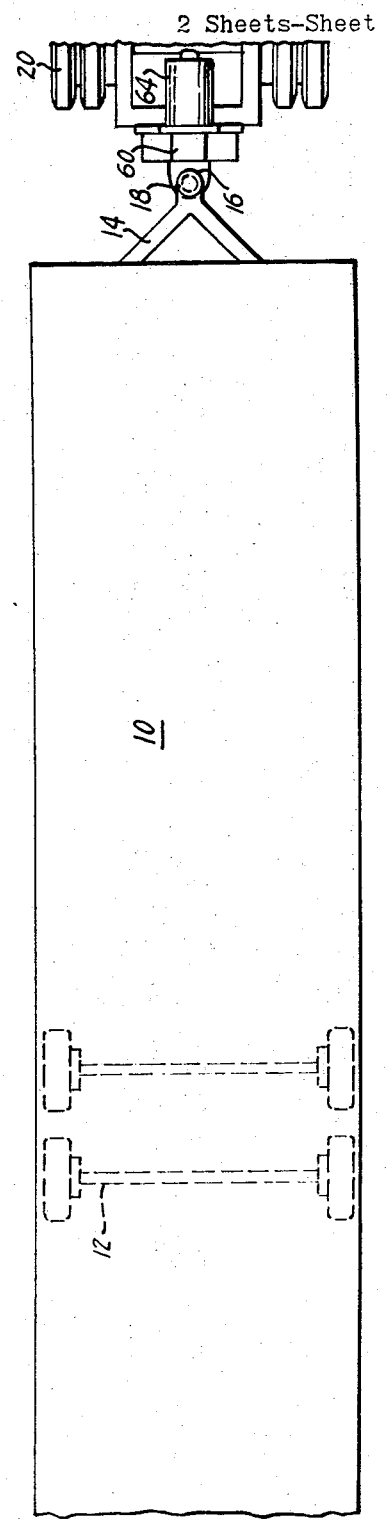

United States Patent Office 3,554,578
Patented Jan. 12, 1971

3,554,578
ADJUSTABLE TRAILER HITCH
Rowland H. Reed, 1505 Rock Rose Road,
West Sacramento, Calif. 95691
Filed Nov. 12, 1968, Ser. No. 774,867
Int. Cl. B60d 1/06
U.S. Cl. 280—490                                1 Claim

ABSTRACT OF THE DISCLOSURE

The two elements of a trailer hitch are connected respectively to the forward end of a trailer and to the rear end of a truck or other towing vehicle, the latter element being vertically movable by power to effect the tilting of the trailer when desired.

BACKGROUND OF THE INVENTION

It requires heavy towing vehicles to move from place to place house trailers of substantial length, for example from fifty to sixty feet, these trailers being supported centrally of the length thereof on wheeled trucks. Because of the length of the trailers rearwardly of the wheels, passage over uneven ground sometimes causes the rear end of the trailer to drag on the roadway. This is also true when the trailer is being pulled into driveways. It is accordingly desirable to provide some means associated with the trailer hitch to move the forward end of the trailer vertically to be able at all times to enable the rear end of the trailer to clear the roadway or driveway. It has been proposed that trailer hitches of this general type be provided with means for vertically moving the truck-carried hitch element. However, it is highly desirable that the means for moving the trailer hitch vertically be accomplished instantly from controls in the cab of the truck, whereby, for example, in moving upwardly over a ramp leading into the driveway, the forward end of the trailer can be depressed to move the rear end upwardly to prevent it from dragging on the roadway or the ramp.

SUMMARY OF THE INVENTION

One element of the trailer hitch, for example, a ball adapted to be engaged in the conventional socket on the forward end of the trailer, is carried by a crosshead at the rear end of the truck. This crosshead has threaded engagement with a rotatable shaft and is provided with lateral extensions having cylindrical elements movable along guide rods parallel to the rotatable shaft. The upper end of the shaft is provided with power operated means for rotating it whereby the trailer hitch may be moved vertically to any desired extent to permit the rear end of the trailer to clear a roadway or a driveway ramp. The engagement of the cylindrical elements of the cross head prevents rotation of the latter during the raising and lowering operation. Such operation is accomplished by a reversible motor, the controls of which are preferably in the cab of the truck so that the motor is adapted to respond instantly to the driver's control to raise or lower the front end of the trailer. Moreover, when parking the trailer on a trailer parking lot, the power operated means referred to permits the rear end of the trailer to be raised to block it up in the usual manner, after which the forward end of the trailer is raised for the blocking of the forward end thereof, when the trailer is to remain for a substantial time in its parked position.

BRIEF DESCRIPTION OF THE DRAWING

FIG. 1 is a side elevation of a large trailer centrally supported on wheels, the rear end of the towing vehicle and the means connecting such vehicle to the trailer being shown;

FIG. 2 is a fragmentary plan view of the same;

FIG. 3 is a section on line 3—3 of FIG. 1;

FIG. 4 is a similar view on line 4—4 of FIG. 3; and

FIG. 5 is a horizontal sectional view on line 5—5 of FIG. 3

DESCRIPTION OF THE PREFERRED EMBODIMENT

Referring to FIG. 1, the numeral 10 designates a long trailer of the house-type, for example, supported centrally thereof by a wheeled truck 12. The forward end of the trailer is provided with converging arms 14 (FIG. 2) having at their forward ends the usual conventional socket 16, forming part of a trailer hitch, and adapted to receive a ball 18, carried by the towing vehicle as described below.

The towing vehicle comprises usually a relatively heavy truck 20 having a frame 22, the rear end of which is provided with a cross member 24 (FIG. 5) and adjacent the top of the frame an additional rear cross member 26 is provided and suitably welded or otherwise secured to the longitudinal members of the frame 22 for a purpose to be described. A pair of spaced vertical parallel plates 28 (FIGS. 3 and 4) are bolted as at 30 or otherwise secured to the rear frame member 24 of the truck and are utilized for supporting the means associated with the trailer hitch ball 18. Upper and lower transverse plates 32 and 34 are welded to the vertical plates 28. Spaced vertical parallel guide rods 36 are secured at their upper and lower ends to the plates 32 and 34, respectively, and are adapted to guide for vertical movement a crosshead indicated as a whole by the numeral 38. This crosshead comprises a plate 40 extending transversely of the rear of the truck and provided at its ends with cylindrical elements 42 surrounding and slidable upon the vertical guide rods 36. Centrally of its length, the plate 40 is provided with a bracket 44 secured by bolts or any other suitable means 46 to the plate 40 and having its lower horizontal end 47 carrying the ball 18 of the trailer hitch.

Centrally of its length (FIG. 5) the plate 40 carries a collar 48 surrounding and in threaded engagement with a vertical rotatable operating rod 50. The lower end of this rod is arranged in a bearing 52 carried by the plate 34, the bearing having a closed lower end and a thrust ball 54 being arranged beneath the lower end of the operating rod 50. The upper end of this rod extends through the upper plate 32 and is provided therebelow with a thrust washer 56 welded thereto. Above the plate 32 the operating rod 50 is provided with a bevel gear 58 arranged in a housing 60 and meshing with a bevel pinion 62 carried by the shaft of a motor 64. This motor is mounted on the cross plate 26 (FIG. 4) and is provided with the usual wires 66 leading to a reversing switch (not shown) preferably located in the driver's cab on the truck. Accordingly, the reversible motor 64 can rotate the operating rod 50 in either direction to raise or lower the crosshead 38.

In operation, travelling over good highways, the crosshead 38 will be arranged in a position to hold the body of the trailer substantially horizontal as shown in solid lines in FIG. 1. Assuming that the trailer has been hauled to a trailer parking lot and it is desired to block up the trailer in accordance with the usual practice, the motor 60 will be operated to move the crosshead downwardly, for example, thus moving the trailer body to the broken line position 70 in FIG. 1, whereupon blocks 72 may be placed under the rear end of the trailer. The motor 64 then will be reversed and the forward end of the trailer raised, and when the rear end rests upon the blocks 72, the body may be further raised to the broken line position indicated by the numeral 74 in FIG. 1, whereupon forward blocks 76 may be arranged beneath the forward end of the trailer, thus supporting the trailer in a horizontal position with the wheels of the truck 12 raised from the ground. The operation of the crosshead permits the use of blocks of different lengths, depending upon the irregularity of the parking lot surface, so that the trailer body may be properly leveled.

While travelling, the truck and trailer may be pulled into a service station or other place where there is a raised ramp leading into the establishment. Under such conditions, when the truck moves upwardly over the ramp, it automatically raises the trailer hitch tending to depress the rear end of the trailer, under which conditions the rear end of the trailer might drag upon the roadway. Under such conditions, the truck driver will operate the motor 64 to move the forward end of the trailer downwardly, thus lifting the rear end of the trailer to clear the surface over which it is travelling.

It will be apparent that the rods 36 guide the crosshead 38 in its vertical movement and prevents rotation thereof so that the rotation of the operating rod 50 effectively moves the crosshead vertically upwardly or downwardly, according to the direction of rotation of the motor shaft. The structure is extremely rugged and particularly adapted for use in moving long, heavy house trailers, for example, those running from fifty to sixty feet in length. Instantaneous control of the motor 64 is provided so that the rear end of the trailer can always be raised to clear obstructions or surfaces on which it might drag, and also provides means for facilitating the blocking up of the trailer on a parking lot.

From the foregoing it will now be seen that there is herein provided an improved adjustable trailer hitch which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:

1. Towing apparatus, comprising a towing truck, a trailer, a pair of hitch elements connecting the truck and trailer, one of the hitch elements being connected to the forward end of a trailer, a crosshead carrying the other of said elements, a pair of vertical guide rods parallel to each other and fixed to the rear end of the truck and along which said crosshead is vertically slidable, a threaded shaft arranged vertically between and parallel to said rods and having threaded engagement with said crosshead, and means including a reversible motor mounted on the truck and having geared connection with said threaded shaft for rotating said threaded rod to raise and lower said crosshead, upper and lower vertical plate means fixed against the rear end of the frame of the truck, horizontal plates secured to said plate means adjacent the top and bottom thereof and to which the upper and lower ends respectively of said guide rods are fixed, a bearing carried by said lower plate and supporting said threaded shaft, said shaft extending through the upper of said plates and being provided at its upper end with a gear, said motor being reversible and mounted on the top of the frame of the truck near the rear end thereof and a bevel pinion carried by the shaft of said motor and meshing with and rotating said gear in either direction to feed said crosshead upwardly or downwardly, said crosshead comprising a plate extending transversely of the truck and provided at its ends with cylindrical bearings slidable on said guide rods, such plate being provided forwardly thereof and centrally of its length with an internally threaded collar mounted on said threaded shaft, a bracket secured to the rear face of said plate and having a lower horizontal flange to which said other element of said trailer hitch is fixed alternatively for raising or lowering in the alternative both ends of said trailer while in movement for avoiding dragging the rear of said trailer and maneuvering over inclines in the road and for raising the rear and forward ends of said trailer consecutively for the blocking thereof, said lower plate being provided with a bearing for said threaded shaft having a closed bottom, a thrust ball arranged between the lower end of said threaded shaft and said bottom of said bearing, and a thrust bearing fixed to said threaded shaft adjacent its upper end and engageable against the lower face of said upper plate.

References Cited

UNITED STATES PATENTS

| 2,072,473 | 3/1937 | Baumberger | 280—490 |
| 2,189,864 | 2/1940 | McDaniel | 280—490 |
| 2,546,491 | 3/1951 | Bill | 280—490 |
| 3,236,541 | 2/1966 | Poteet | 280—490 |

FOREIGN PATENTS

| 972,718 | 8/1950 | France | 280—490 |
| 210,035 | 8/1940 | Switzerland | 280—490 |

LEO FRIAGLIA, Primary Examiner